April 18, 1967   R. H. QUINT ET AL   3,315,102
PIEZOELECTRIC LIQUID CLEANING DEVICE
Original Filed Aug. 13, 1962   2 Sheets-Sheet 1

INVENTORS
ROBERT H. QUINT
FRANK H. MACH
BY
S.C. Yuter
ATTORNEY

INVENTORS
ROBERT H. QUINT
FRANK H. MACH
BY
*G.C. Yuter*
ATTORNEY 3,315,102
PIEZOELECTRIC LIQUID CLEANING DEVICE
Robert H. Quint, Jamaica, and Frank H. Mach, Long Island City, N.Y., assignors to Electromation Components Corporation, Huntington Station, N.Y., a corporation of Delaware
Continuation of application Ser. No. 216,608, Aug. 13, 1962. This application Jan. 14, 1963, Ser. No. 266,119
5 Claims. (Cl. 310—8.1)

This application is a continuation of application Ser. No. 216,608, filed Aug. 13, 1962.

This invention relates to sonic and ultrasonic systems, and particularly to systems for converting low frequency energy to high-frequency electro-mechanical energy for use in sonic and ultrasonic applications.

There are many applications in the sonic and ultrasonic frequency range where electro-acoustical transducers are or can be employed. The frequencies employed for such use may be within the range of 10,000 to 1,000,000 cycles per second. The terms sonic and ultrasonic are therefore for convenience in use rather than to define exact ranges of frequency.

Present conventional apparatus employs radio-type circuitry utilizing radio tubes or transistors with power supplies and suitable inductance and capacitance components to establish resonance circuits with natural resonance frequencies corresponding to those desired to activate and operate the electro-acoustical transducers. High-frequency motor generators are also employed in many instances.

Two particular disadvantages of such present conventional equipment include the expense or cost of the equipment for generating such frequencies, and the reaction upon such equipment caused by variations in the load imposed on the electro-acoustical transducers.

The higher cost of present conventional equipment results from the use of active components and the power supply sources required for their operation. By the use of passive components and elements, as permitted by the present invention, the cost of sonic and ultrasonic systems can be reduced, and their use and application made more general and convenient.

A primary object of the present invention is to provide a system of passive elements or components that will be relatively inexpensive, and considerably cheaper than the cost of present conventional equipment used for the purpose of producing sonic or ultrasonic frequencies for a work load.

The present conventional systems which employ radio-tube type circuitry utilize such tubes as oscillators to work with the related circuits which must be tuned to operate at resonance at the frequency desired. If the circuits are detuned, the oscillating system fails to operate as desired.

Variations in load in present conventional systems tend to detune the circuitry, so that the essential conditions of resonance, for the oscillating systems of the tube circuitry, are so modified in operation that the frequency necessary for the operation of the related transducer becomes no longer available, unless or until some compensation is made for such change of load and the consequent detuning of the oscillator circuitry.

The work load to which the sonic or ultrasonic system is applied is usually of such character that the load can and may vary during operation of the applied system. Since the transducer that supplies the load is connected in the ultimate or final circuit of the oscillating system, any variation in the load changes the load reaction on the transducer. Such change affects the transducer parameters in the oscillating system and such change is reflected back to the basic oscillator and to the related oscillator tuned circuitry to change the parameters to values that do not and cannot establish or maintain resonance and oscillations.

The oscillator and its related tuned circuits thus become detuned and stop functioning, in the absence of suitable regulating or feedback-type compensating control circuits that will retune the oscillator circuitry to the changed conditions in the work load. These additional regulating or compensating and control circuits increase the cost and introduce further complexities into the system.

Another object of the invention is to provide a system that is rugged and less critical and less sensitive to variations in the work load to which the transducer is applied.

The manner in which an oscillating circuit may be detuned by the work load will depend upon the nature of the load and on the type of transducer employed to work on the load. For the purpose of this illustration, two types of transducers may be considered, namely, the electro-magnetic type and the piezo-electric or crystal type. The electro-magnetic type may include magnetostrictive, loudspeaker or other forms that include a vibratable member to serve as a mechanical coupling from the electrical system to the mechanical load.

The load on the transducers may be ambient air, free or in a column or other restricted cavity with relatively fixed volume, or the load may be physical and coupled, to react with substantial inertial reaction. The nature of the load determines the Q of the system, and that parameter Q is a measure of the sharpness of resonance of the part of the system that includes the output oscillating circuit and the transducer fed thereby.

A high value of Q implies a sharply tuned circuit or system. Since Q is a measure of the ratio of reactive or oscillating field energy to work energy absorbed in the load, a variation in load will change the Q of the tuned circuit or system. The system thereupon becomes unstable and may drop out of resonance and lose its power to transfer energy to the load. This is one of the disadvantages of the conventional system, in which the input and the output circuits must both be held sharply tuned and critically coupled to operate properly to transfer energy to the load.

An important feature of the present invention is that the input circuit need not be and actually is not sharply tuned and is not critically coupled to the oscillating system that feeds energy into the work load.

Another disadvantage of the conventional system that is important to consider here, in pointing out another feature of the present invention, is the effect of the variation in load where the work load consists of a liquid bath that is agitated by one or more crystal type transducers.

When energy is fed into a liquid bath by electro-mechanical vibrations the top surface of the bath acts as a surface of discontinuity between the bath and the air above the bath. Reflections of energy therefore result, and cause standing waves in the bath and back into the oscillating system. The transfer of energy to the liquid bath work load is therefore blocked. This is a result of the fact that the resonance condition of the conventional tuned circuits must be sharply maintained.

Since the system of the present invention does not require a fixed resonant input circuit to excite and energize a fixed output resonant condition, variation of the work load cannot detune the system of the present invention. Instead, the operation is such as to adjust to the changed conditions created by the variation in the work load.

Thus, for example in the case of a liquid bath, as in a cleaning solution, a variation in the work load will change the conditions for resonance and the system will adjust itself to establish resonance at such changed conditions.

In corresponding manner, in the case of an electromagnetic transducer, such as an electrostrictive type or a loudspeaker type, where mechanical load coupling may be effected over short intervals in quick succession, the variation of load in conventional systems changes the Q by reflecting mechanical impedance back into the system as equivalent electrical impedance due to the energy absorption.

Thus, reflected impedance from the work load will affect the Q or creat standing waves, depending upon the type of transducer and the nature of its load. In the conventional system, the tightly fixed resonance frequency condition will be upset and resonance destroyed, so no energy can pass. In the system of the present invention, the energy-transfer system automatically provides a frequency which will shock excite the resonance system to establish energy-transfer conditions.

Another object of the invention is to provide a system in which low-frequency electrical energy is converted into high-frequency electro-mechanical energy for application as high-frequency mechanical energy to a work load according to the form of mechanical energy required for that work load.

A further object of the invention is to provide a system in which low-frequency electrical energy is converted into high-frequency electro-mechanical energy by a frequency conversion system that is not affected by variations in a work load to which the electro-mechanical energy is applied.

Another object of the invention is to provide a frequency conversion system in which low frequency energy is supplied to a high-frequency resonant system at a rate not necessarily related to the frequency of the resonant system, and during short spaced intervals to shock excite the resonant system which supplies energy to a work load.

A feature and important advantage of the invention therefore is the independence of the frequency-conversion system from any variations in the work load.

A further object of the invention is to provide an ultrasonic system in which a frequency conversion system is arranged to be independent of the parameters of a work load, thereby enabling the frequency conversion system to be fully effective independently of any variations in the Q of the work load, or of any energy reflections back from the work load.

In accordance with the present invention, one or more transducers may be applied to operate the work load. Accordingly, one or more operating frequencies may be generated or developed to energize and activate the respective transducers.

Further, in accordance with the present invention, energy may be derived from any low frequency source, such as a power line of 50 or 60 cycles per second, or from a switching system in which a switch operates to supply energy to the input end of the apparatus of this invention. A resonant system is provided that has one or more resonant branches or arrangements and that will have one or more inherent resonance frequencies for energizing and operating the one or more transducers employed in the particular work system to which the invention is to be applied.

The present invention utilizes a resonant system to energize one or more transducers to transfer energy to a work load. The resonant system is shock excited in such manner that the operativeness of the exciting system is independent of changed conditions in the resonant system and therefore is independent of variations in the work load.

In a preferred form of the invention, a low voltage of low frequency is supplied to and amplified by a step-up transformer and then supplied to a high-voltage storage capacitor from the secondary winding. A spark-gap assembly, preferably more than one spark-gap, is connected between the capacitor and an inductance, and is broken down by the high voltage and serves to electrically connect the storage capacitor to the inductance to complete a resonant circuit. Energy is taken from the inductance in any suitable manner and fed to the transducer means, which may be one or more transducers, depending upon the work load.

Depending upon the nature of the transducers, they may be inductive or capacitive elements of the resonant circuit, and should therefore be considered in determining the values of the capacitor and of the inductance for the resonant circuit.

The breakdown of the spark-gap means will permit energy flow from the storage capacitor to the inductance of the resonant circuit. The parameters including the Q of the resonant circuit, and the parameters of the transducer circuit, will quench the spark-gap activity and temporarily open the resonant circuit at such spark-gaps. Such breakdown and quenching of the spark-gaps will provide the shock excitation of the resonant system including the resonant circuit and the transducer system energized therefrom.

Various other modifications and arrangements of the circuitry may be utilized, in which the spark-gap means serve to shock excite the resonant system.

One feature of the present invention is that it is substantially unidirectional in its transfer of power from the supply source to the load. The input step-up transformer is provided to have a relatively high leakage reactance between the primary winding and the secondary winding. Consequently, the transfer reactance is relatively small at the low frequency of the input power. At the high frequency of the tuned circuitry the reactance reflecting back into the primary is relatively high so that practically no energy is reflected back.

The resonant circuit together with the spark-gap system as energized from the secondary of the transformer thus acts as a frequency converter, taking the incoming energy of low frequency from the input to the transformer and converting that energy of low frequency into energy of high frequency corresponding to the resonant frequency of the resonant circuit to be delivered to the transducers.

The operation is controlled by the breakdown of the spark-gaps. The spark-gaps act like very high speed switches to transmit the energy to the resonant circuit as a shock excitation. Upon resonating, the resonant circuit then transfers energy in a forward direction to the transducers. The reaction on the gaps from the resonant circuit components, due to the high frequency of the resonant circuit, is such as to reduce the voltage across the gaps to a value below the ionizing potential of the gaps, as a result of which the arcs across the gaps are quenched and the gaps opened as switches.

A feature of the invention as disclosed herein is that when several transducers are employed, as, for example, of the crystal type, those transducers are essentially part of the resonant system, and since each transducer has its own equivalent capacitance value, the resonant system including those transducers will have several different resonance frequencies, corresponding generally in number to the number of transducers.

Consequently, a system of a plurality of transducers can be caused to operate with each transducer operating at a different frequency corresponding to its resonance relationship to the remainder of the circuit. In many applications the impression of different operating frequencies on a load can provide many benefits.

For example, in the application of the present invention to ultrasonic cleaning by subjecting a solution to ultrasonic vibration in order to clean the articles immersed in the solution, the use of several frequencies in vibrating the solution can achieve more effective action than the use of a single frequency.

A particular feature and advantage of such a system is that the frequency-generating circuit does not become detuned by any variation in the load or in the load level of the liquid, even though several transducers are employed.

The self-coupling and decoupling action of the spark-gaps to and from the resonant system makes the spark-gap operation completely independent of varying conditions in the work load and their reflections back into the resonant circuitry.

The general principles of the invention, and the manner in which the invention may be utilized and applied, are described in more detail in the following specification, taken together with the drawings, in which FIGURE 1 is a schematic block diagram illustrating the arrangement of the components of the system;

Figure 2:
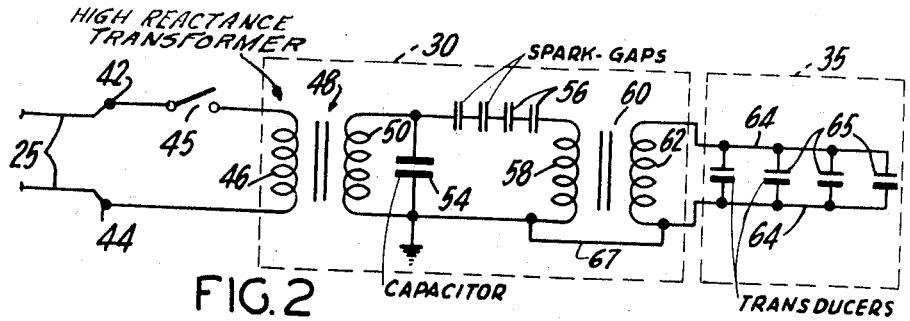
FIGURE 2 is a circuit diagram of a circuit arrangement showing the corresponding components represented in the block diagram of FIGURE 1.
Figure 7:
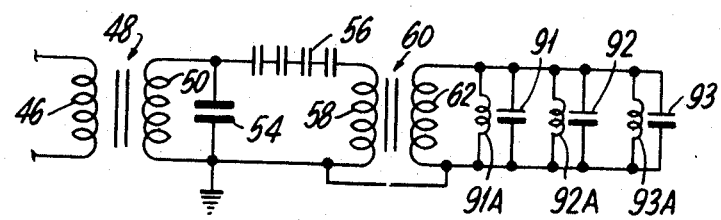
Figure 8:
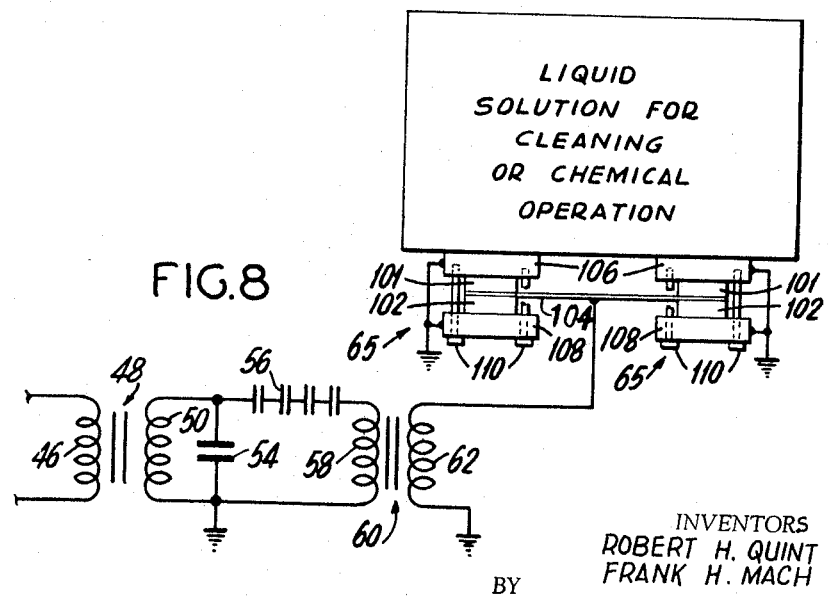

FIGURE 7 is a simple diagram corresponding to that in FIGURE 2 in which a plurality of crystal-type transducers are employed to operate at different frequencies and are provided with individual inductance elements to establish the appropriate resonance conditions at those frequencies; and FIGURE 8 is a schematic diagram of a system similar to that shown in FIGURE 2 and illustrating the application of a plurality of crystal transducers to a utilization work load consisting of a liquid bath which may be used as an ultrasonic cleaning solution.

Figure 1:
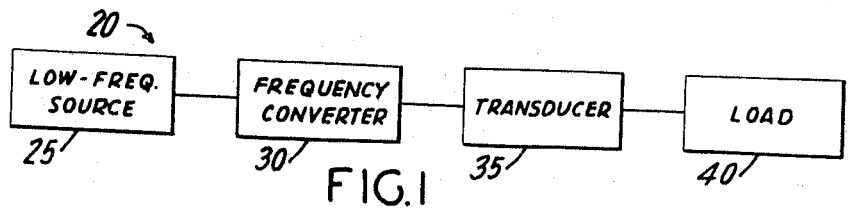

As shown in the block diagram of FIGURE 1, an ultrasonic frequency system 20 for converting the low frequency from a simple power source to an elevated frequency in the ultrasonic range of about 10,000 cycles per second to about 1,000,000 cycles per second, is shown as comprising a source 25 of a frequency commercially available or easily produceable, a frequency converter or converting system 30, a transducer 35 and a work load 40. For convenience in reference, this system will be referred to as ultrasonic, although the frequency range indicated above will go beyond such range as usually defined, and will include sonic frequencies as well.

FIGURE 2 shows a simple circuit representing the functions indicated by the block diagram of FIGURE 1.

As shown in FIGURE 2, an input energy circuit 25 supplies electrical energy at low frequency to two input terminals 42 and 44. The low frequency energy is supplied from those terminals through a switch 45 to the primary winding 46 of a high-reactance transformer 48 having a secondary winding 50. A capacitor 54 is bridged across the secondary winding 50. A plurality of spark-gaps 56 in series and the primary winding 58 of a transformer 60 are connected across the capacitor 54. The secondary winding 62 of the transformer 60 is connected to a circuit 64 to supply transformed high frequency energy to a plurality of transducers 65. One terminal of the secondary winding 50 is grounded, and the lower indicated terminal of the secondary winding 62 is also grounded as indicated by the connection 67 from the lower conductor of the circuit 64.

Since the transformer 60 will operate at relatively high frequencies, the coupling between primary and secondary windings will be appropriate for such frequency.

Figure 3:
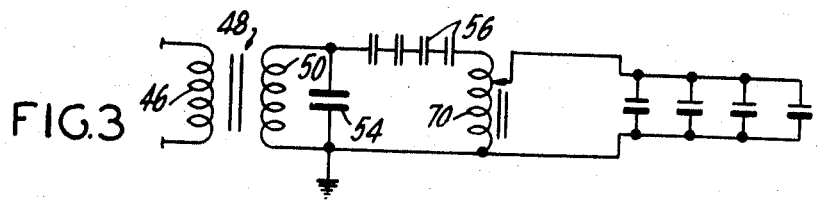
FIGURE 3 is a variation of the circuit arrangement in FIGURE 2.

FIGURE 3 shows a circuit arrangement similar to that in FIGURE 2, except that, instead of the transformer 60 of FIGURE 2, a variable coil 70, or an equivalent auto-transformer, may be employed in the circuit of FIGURE 3. The other elements of the circuit of FIGURE 3 are numbered the same as in FIGURE 2.

Figure 4:
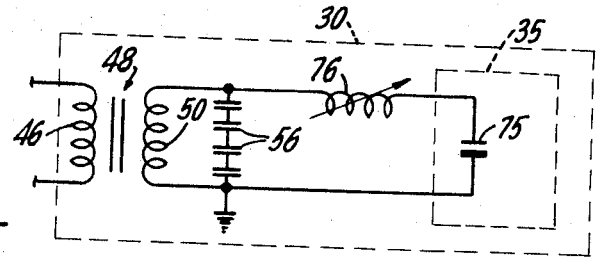
FIGURE 4 shows a simple circuit diagram of a system in which an electro-acoustic transducer has a capacitive characteristic.

In FIGURE 4 is shown a modification of the circuit of FIGURE 3, and comprises the input circuit connections and the transformer 48, as in FIGURE 3, with the spark-gap 56 connected directly across the secondary winding 50. A resonance circuit across the spark-gap 56 includes a transducer 75, such as a piezo-electric crystal, having a capacitance that is balanced by the inductance of a variable coil 76 to establish resonance conditions in the circuit across the gaps 56. Breakdown of the spark-gaps provides a direct path for the high frequencies of the oscillating circuit including the coil 76 and the transducer 75.

Figure 5:
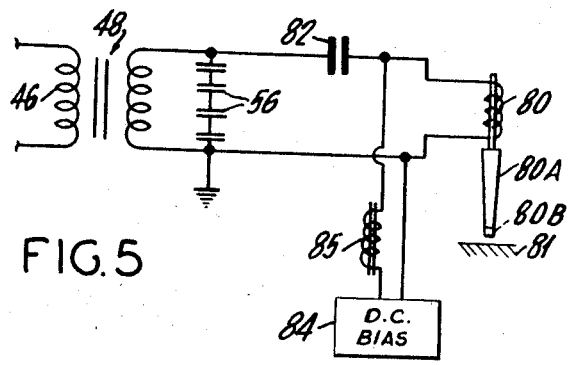
FIGURE 5 is a diagram of a simple circuit similar to that in FIGURE 4, except that the transducer is of the electro-magnetic type and has an inductance that requires the use of an external variable capacitor for tuning; and that may utilize a D.C. bias for controlling the operating range of the electro-magnetic part of the transducer.

In FIGURE 5 is shown an arrangement that is a modification of that of FIGURE 4 to the extent that an electromagnetic or electro-mechanical transducer is employed for the final conversion of the electric energy to mechanical motion and mechanical energy. To establish the resonance condition in the resonant circuit that bridges the spark-gaps 56 and includes the transducer coil 80, a capacitor 82 is employed.

Where the electro-magnetic transducer 80 is of a type in which the D.C. bias may be employed to control the optimum operating range of the transducer 80, the direct current bias may be established in any suitable conventional way, such biasing elements being indicated or represented by the block 84 which will supply the biasing direct current to the coil of the transducer 80 through a suitable choke 85 to exclude the high frequency of the resonant circuit from entering the direct current bias supply 84.

Where an electro-magnetic transducer is utilized as in FIGURE 5, the transducer 80 that is represented may be any one of the electro-magnetic types, including electro-mechanical, such as loudspeakers, or magneto-strictive devices, or any other that will convert electrical or electro-magnetic energy to mechanical energy, where mechanical motion is established to operate on a work circuit or on work material representing the work load.

Figure 6:
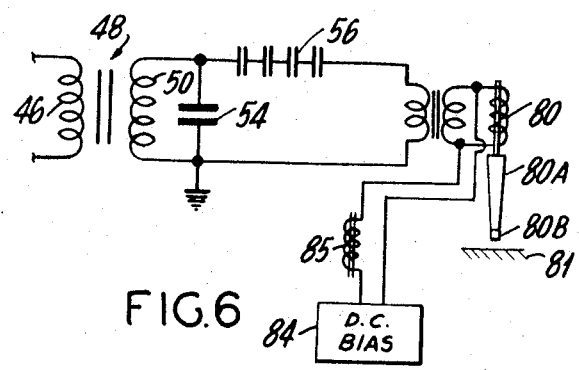
FIGURE 6 is a simple circuit diagram of a circuit arrangement similar to that in FIGURE 2, in which the energy converting system is employed to energize and control an electro-magnetic transducer similar to that of FIGURE 5.

FIGURE 6 is similar to FIGURES 2 and 5, to the extent that the frequency conversion components correspond to those in FIGURE 2, and the resonant circuit components of FIGURE 5 are retained including the electro-magnetic transducer 80 and the capacitor 82 with the D.C. bias source 84 and blocking choke 85.

FIGURE 7 shows a simple circuit also utilizing the frequency conversion arrangement of FIGURE 2, for supplying high frequency energy to a plurality of transducers 91, 92 and 93 of the crystal type, with corresponding and related inductance coils 91A, 92A and 93A provided to establish resonance conditions within the closed circuit including each couple of related elements.

In this circuit arrangement of FIGURE 7, one of the important features of the invention is utilized. Each of the crystals may have its own inherent frequency of oscillation. The operation of the spark-gaps is such as to cause several frequencies to be generated in the related resonant system, and thus all of the crystals are excited and operated at the same time. One particular field of application is in the vibrating operation of a supersonic cleaning bath, as shown in FIGURE 8.

In a system similar to that shown in FIGURE 2, in which four spark-gaps were used in series and four crystal transducers used for operating a cleaning bath, four distinct closely related frequencies were generated, namely, 19.3 kc.; 22 kc.; 27 kc. and 30 kc.

In FIGURE 8 is shown one field of application of the crystal type transducers where the work load is a liquid in a vessel. Such a liquid vessel system may be utilized as an ultrasonic cleaning system, or the vessel may be one containing chemical elements in which emulsions are to be formed. In another type of application, the vessel with the liquid may be for the purpose of inducing accelerated contact and chemical reactions.

The circuitry shown for controlling the operation in FIGURE 8 corresponds to that of FIGURE 2 in which the crystal transducers 65, of which only two are shown in FIGURE 8, are essentially crystal sandwiches in which two crystal elements 101 and 102 are pressed against a common intermediate electrical terminal of sheet metal 104 by two outer aluminum blocks 106 and 108. Those outer blocks are held tightly mechanically coupled by suitable coupling means, here indicated as bolts 110. The two metal blocks 106 and 108 are electrically connected to the other terminal of the secondary winding 62 of the transformer through ground, so that the voltage from the transformer winding 62 is placed across each of the crystals 101 and 102 in each of the transducer assemblies 65.

The top conductor from the transformer winding 62 in the arrangement shown in FIGURE 8 serves as the common mid-terminal for all of the crystals in all of the transducers utilized in a work load system of the type shown in FIGURE 8.

By appropriate tuning or dimensioning of the spark-gaps, those spark-gaps may be controlled to operate in some predetermined sequence in order to establish and generate a specific series of desired ultrasonic frequencies in the crystal transducers. Similarly, the crystals may be arranged for individual or preferred responsiveness to the various frequencies generated in the tank circuit so that preferred reaction and interaction patterns may be established in the liquid bath if so desired.

The transducers 65 are preferably of lead zirconate titanate which provide a high efficiency of operation and also may be utilized with a liquid bath operating up to 200 degrees F.

It will be understood that the showing of four spark-gaps and four transducers is merely illustrative. Any number of spark-gaps may be employed, either one or more, to generate a number of different frequencies which may then be utilized to operate a similar or different number of crystal transducers.

Thus, one or more spark-gaps may be employed to generate a series of frequencies running over a substantial frequency spectrum, to permit an effective scanning action to be established through the spectrum to subject a cleaning fluid to each frequency in one or more transducers within the range defined in that operating spectrum.

The invention is thus not limited to a single frequency of operation, but may be operated at various frequencies that may be found particularly effective either with the type of solutions employed for the cleaning operation, or for the nature of the load.

A further feature and advantage of this system of multiple frequencies is that the system is essentially self-tuning in response to any variation in the load as observed by the crystal transducers.

This feature thus enables this system to adjust inself immediately and automatically to any variation in load due to insertion of more material to be cleaned in a bath or due to the removal of cleaned articles from a bath, or to variations in the work load other than a bath.

In another general type of application, the arrangement shown in FIGURE 5 may be employed to operate a magnetostrictive type of transducer, by way of example. The transducer 80 may then include an acousto-mechanical amplifying device for transmitting the acousto-mechanical energy from the transducer 80 to a conventional work tool that is to engage and machine a work piece. In such case, the reaction of the work load against the work tool would be a mechanical impedance that would change the Q of the resonant circuit so a slightly different frequency would be necessary to establish resonance. In a conventional system, returning of the oscillator in the vacuum-tube circuitry would be necessary. In the system of the present invention, the shock excitation of the spark-gaps automatically establishes resonance at the frequency necessary.

The invention is thus not limited to specifically the arrangement in details as illustrated in the drawings, since various modifications may be made both in arrangement and in the number of elements without departing from the spirit and scope of the invention as set forth in the appended claims.

What is claimed is:

1. In combination with a liquid bath in which articles to be cleaned are immersed and which is subject to a range of variations in work load, a plurality of vibratable means in driving contact with said liquid bath, said vibratable means having a range of resonant frequencies over said range of variations in work load, a power source of relatively low frequency alternating current, means energized from said power source to generate a spectrum of relatively high driving frequencies and comprising a tank circuit with a plurality of branches and including a plurality of series-connected spark gaps in one of said branches and including an input step-up transformer having a relatively high leakage reactance between its primary and secondary windings, the power source being connected to the primary winding of the transformer and the secondary winding being connected to said tank circuit, whereby said input transformer has a high transfer reactance at the resonant frequency of the tank circuit but has a relatively small transfer reactance to the frequency of the power source so that relatively little energy is reflected back from the tank circuit to the power source, and means applying said driving frequencies to said plurality of vibratable means, said spectrum of driving frequencies substantially corresponding to said range of resonant frequencies of said vibratable means over said range of variations in work load.

2. The structural combination of claim 1, and wherein said plurality of vibratable means comprises a plurality of crystal transducers.

3. The structural combination of claim 1, and wherein said plurality of vibratable means comprises a plurality of spaced piezo-electric crystal sandwich assemblies having a common intermediate electrical terminal, each sandwich assembly comprising a pair of piezo-electric crystal elements disposed on opposite sides of said metal terminal, respective metal blocks disposed outwardly of the crystal elements, and mechanical coupling means tightly clamping the metal blocks against the crystal elements and clamping the crystal elements against the common electrical terminal, all the metal blocks being electrically connected together, and circuit means connecting the output of said tank circuit to said common electrical terminal and said metal blocks.

4. The structural combination of claim 1, and transformer coupling means between said tank circuit and said plurality of vibratable means.

5. The structural combination of claim 1, and wherein at least one of the vibratable means comprises an electromagnetic transducer, and direct current bias current supply means connected to said transducer.

(References on following page)

References Cited by the Examiner

UNITED STATES PATENTS

| | | | |
|---|---|---|---|
| 943,969 | 12/1909 | DeForest | 331—127 |
| 1,345,352 | 7/1920 | Cutting et al. | 331—127 |
| 1,376,081 | 4/1921 | DeMooy | 331—127 |
| 1,452,064 | 4/1923 | Bush | 331—127 |
| 1,889,609 | 11/1932 | Mutscheller | 331—127 |
| 2,394,055 | 2/1946 | Hansen | 331—127 |
| 2,760,501 | 8/1956 | Gander | 134—1 X |
| 2,851,877 | 9/1958 | Joy | 310—8.1 |
| 2,891,176 | 6/1959 | Branson | 134—1 X |
| 3,075,097 | 1/1963 | Scarpa | 310—8.1 |
| 3,117,768 | 1/1964 | Carlin | 310—8.1 X |
| 3,177,416 | 4/1965 | Pijls et al. | 318—118 |

FOREIGN PATENTS 554,654   1/1957   Italy.

MILTON O. HIRSHFIELD, *Primary Examiner.*

M. O. WOLK, *Examiner.*

J. ZATARGA, A. J. ROSSI, J. D. MILLER,
*Assistant Examiners.*